(12) United States Patent
Harashima et al.

(10) Patent No.: US 8,797,600 B2
(45) Date of Patent: Aug. 5, 2014

(54) IMAGE FORMING APPARATUS AND GRADATION CORRECTION METHOD WITH DENSITY UNEVENNESS DETECTION

(75) Inventors: Takashi Harashima, Sagamihara (JP); Hideaki Tanaka, Fussa (JP); Katsuyuki Hirata, Toyokawa (JP); Toru Yamaguchi, Koganei (JP); Takaaki Kooriya, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 225 days.

(21) Appl. No.: 13/455,070

(22) Filed: Apr. 24, 2012

(65) Prior Publication Data

US 2012/0274986 A1 Nov. 1, 2012

(30) Foreign Application Priority Data

Apr. 27, 2011 (JP) ................. 2011-099499

(51) Int. Cl.
*H04N 1/40* (2006.01)
*G03G 15/00* (2006.01)
*H04N 1/60* (2006.01)

(52) U.S. Cl.
CPC ............. *H04N 1/60* (2013.01); *G03G 15/5058* (2013.01)
USPC ............ 358/3.21; 358/1.2; 358/1.8; 358/1.9; 358/3.01; 358/3.02; 358/3.06; 358/3.1; 358/3.11; 358/3.12; 358/3.23; 358/3.26; 358/504; 358/521; 358/461; 382/168; 382/169; 382/170; 382/171; 382/172; 382/175; 382/254; 382/267; 382/275

(58) Field of Classification Search
None
See application file for complete search history.

(56) References Cited

U.S. PATENT DOCUMENTS

| 6,052,132 | A | * | 4/2000 | Christian et al. | 345/474 |
| 2009/0073469 | A1 | * | 3/2009 | Kita et al. | 358/1.9 |
| 2009/0168109 | A1 | * | 7/2009 | Kishi | 358/3.27 |
| 2009/0317149 | A1 | * | 12/2009 | Takura | 399/301 |
| 2011/0076040 | A1 | * | 3/2011 | Uchidate et al. | 399/49 |

FOREIGN PATENT DOCUMENTS

| JP | 2006-047349 | 2/2006 |
| JP | 2006-106556 | 4/2006 |
| JP | 2006-343679 | 12/2006 |
| JP | 2007-003688 | 1/2007 |
| JP | 2007-264364 | 10/2007 |
| JP | 2008-026551 | 2/2008 |
| JP | 2010-134160 | 6/2010 |
| JP | 2010-134366 | 6/2010 |
| JP | 2010-171689 | 8/2010 |

OTHER PUBLICATIONS

Notifice of Reasons for Rejection for appl. No. 2011-099499, dispatched May 21, 2013, 3 pgs.
Translation of the Notifice of Reasons for Rejection for appl. No. 2011-099499, dispatched May 21, 2013, 5 pgs.

* cited by examiner

*Primary Examiner* — Miya J Cato
(74) *Attorney, Agent, or Firm* — Squire Patton Boggs (US) LLP

(57) ABSTRACT

Image forming apparatus (100) creates a toner pattern on intermediate transfer belt (11) as a preprocessing of gradation correction, and calculates a cycle at which density unevenness is largest. Then, a toner image for gradation correction is formed so as to cancel cyclic unevenness at a cycle at which the largest density unevenness occurs. As a result of this, it becomes possible to suppress the deterioration of density detection accuracy and perform a highly accurate gradation correction even if density unevenness of any cycle occurs.

2 Claims, 10 Drawing Sheets

IMAGE FORMING APPARATUS AND GRADATION CORRECTION METHOD WITH DENSITY UNEVENNESS DETECTION

CROSS REFERENCE TO RELATED APPLICATIONS

This application is entitled to and claims the benefit of Japanese Patent Application No. 2011-099499, filed on Apr. 27, 2011, the disclosure of which including the specification, drawings and abstract is incorporated herein by reference in its entirety.

TECHNICAL FIELD

The present invention relates to an image forming apparatus such as copiers, laser beam printers, facsimiles, and digital multifunction peripherals, and a gradation correction method used therefor.

BACKGROUND ART

Generally, in an image forming apparatus, the image density of a toner image may fluctuate due to disturbances such as changes in the surrounding environment such as temperature and humidity, and temporal changes of the apparatus. Accordingly, in an image forming apparatus, in general, gradation correction is performed to stabilize the image density.

For example, in an image forming apparatus, a gradation pattern image consisting of a plurality of gradation levels is formed on a photoconductor as a test toner image, and gradation correction is performed based on the densities of this gradation pattern image. This gradation correction is performed to correct image gradation characteristics when turning on power, when returning from sleep, when the print count has reached a predetermined number, or when the external environment has significantly changed.

To be specific, in the image forming apparatus, a gradation pattern image is formed on an intermediate transfer belt at the time of gradation correction, and the density of each gradation level is detected by a density sensor. Then, a desired image density is obtained by adjusting a developing bias such that the detected densities match their respective predetermined target densities (that is, by performing gradation correction). In reality, this gradation correction is performed by correcting an input gradation of image data using a gradation conversion table of a control section such that each gradation level has a predetermined density based on the density detection value obtained by a density sensor.

Here, if the detection accuracy of the gradation pattern image is poor, the accuracy of gradation correction will deteriorate accordingly; therefore, up to now, various contrivances have been made to detect the density of gradation pattern image at a high accuracy. Patent Literatures 1 and 2 disclose a technique to use a plurality of gradation pattern images. Moreover, Patent Literatures 3 to 8 disclose a technique in which to cancel density unevenness (cyclic density unevenness) that occurs at the cycle of a developing roller, an intermediate transfer belt, or a photoconductor, a plurality of gradation patterns are positioned at an interval of ½ or M/N (where M and N are coprime natural numbers) of the above-described cycles.

CITATION LIST

Patent Literature

PTL 1: Japanese Patent Laid-Open No. 2010-171689
PTL 2: Japanese Patent Laid-Open No. 2008-26551
PTL 3: Japanese Patent Laid-Open No. 2010-134366
PTL 4: Japanese Patent Laid-Open No. 2007-264364
PTL 5: Japanese Patent Laid-Open No. 2006-47349
PTL 6: Japanese Patent Laid-Open No. 2007-3688
PTL 7: Japanese Patent Laid-Open No. 2006-343679
PTL 8: Japanese Patent Laid-Open No. 2010-134160

SUMMARY OF INVENTION

Technical Problem

However, placing a gradation pattern image at a fixed position so as to cancel a certain cyclic unevenness will result in that when cyclic unevenness due to another factor becomes larger than the original one, it becomes unable to cancel the larger cyclic unevenness. As a result of that, the density detection accuracy of gradation pattern will deteriorate.

In this connection, since there are multiple causal factors of cyclic unevenness such as a developing roller, a photoconductor, and an intermediate transfer belt, there are various modes of cyclic unevenness.

These matters have not been taken into consideration sufficiently in the conventional placement of gradation patterns. As a result, there is a risk that a density detection result is significantly affected by cyclic unevenness, and the accuracy of density detection deteriorates. Deterioration of the accuracy of density detection naturally causes deterioration of the accuracy of gradation correction as well.

It is an object of the present invention to provide an image forming apparatus and a gradation correction method which enable a high-accuracy gradation correction to be performed by suppressing the deterioration of density detection accuracy due to cyclic unevenness.

Solution to Problem

To achieve the object described above, an aspect of the image forming apparatus of the present invention is an image forming apparatus including an image forming unit for forming a toner image on an image bearing member, and a density detection section for detecting a density of a toner image for gradation correction formed by the image forming unit, and the image forming apparatus being adapted to perform gradation correction based on a density detection result obtained by the density detection section, wherein the image forming apparatus comprises a density unevenness detection section for detecting a cycle of density unevenness and a density fluctuation amount in each density unevenness cycle based on a density detection result obtained by the density detection section, and wherein the image forming unit modifies the toner image for gradation correction to be formed on the image bearing member based on the density fluctuation amount obtained by the density unevenness detection section.

One aspect of the gradation correction method of the present invention is a gradation correction method in which a toner image for gradation correction is formed on an image bearing member of an image forming apparatus for performing gradation correction based on a density detection result of the toner image, the method including the steps of: forming a toner pattern on the image bearing member; detecting a cycle of density unevenness of the toner pattern and a density fluctuation amount in each density unevenness cycle; changing the number or position of the toner image for gradation correction to be formed on the image bearing member based on the density fluctuation amount and the cycle of density unevenness; detecting a density of the toner image for gradation correction formed on the image bearing member; and performing gradation correction based on the detected density of the toner image for gradation correction.

Advantageous Effects of Invention

According to the present invention, since even if any cyclic density unevenness occurs, a toner image for gradation correction to cancel that density unevenness can be formed, it becomes possible to suppress the deterioration of density detection accuracy due to cyclic unevenness, and perform high accuracy gradation correction.

DESCRIPTION OF EMBODIMENTS

Hereafter, embodiments of the present invention will be described in detail with reference to the drawings.

[1] General Configuration

Figure 1:
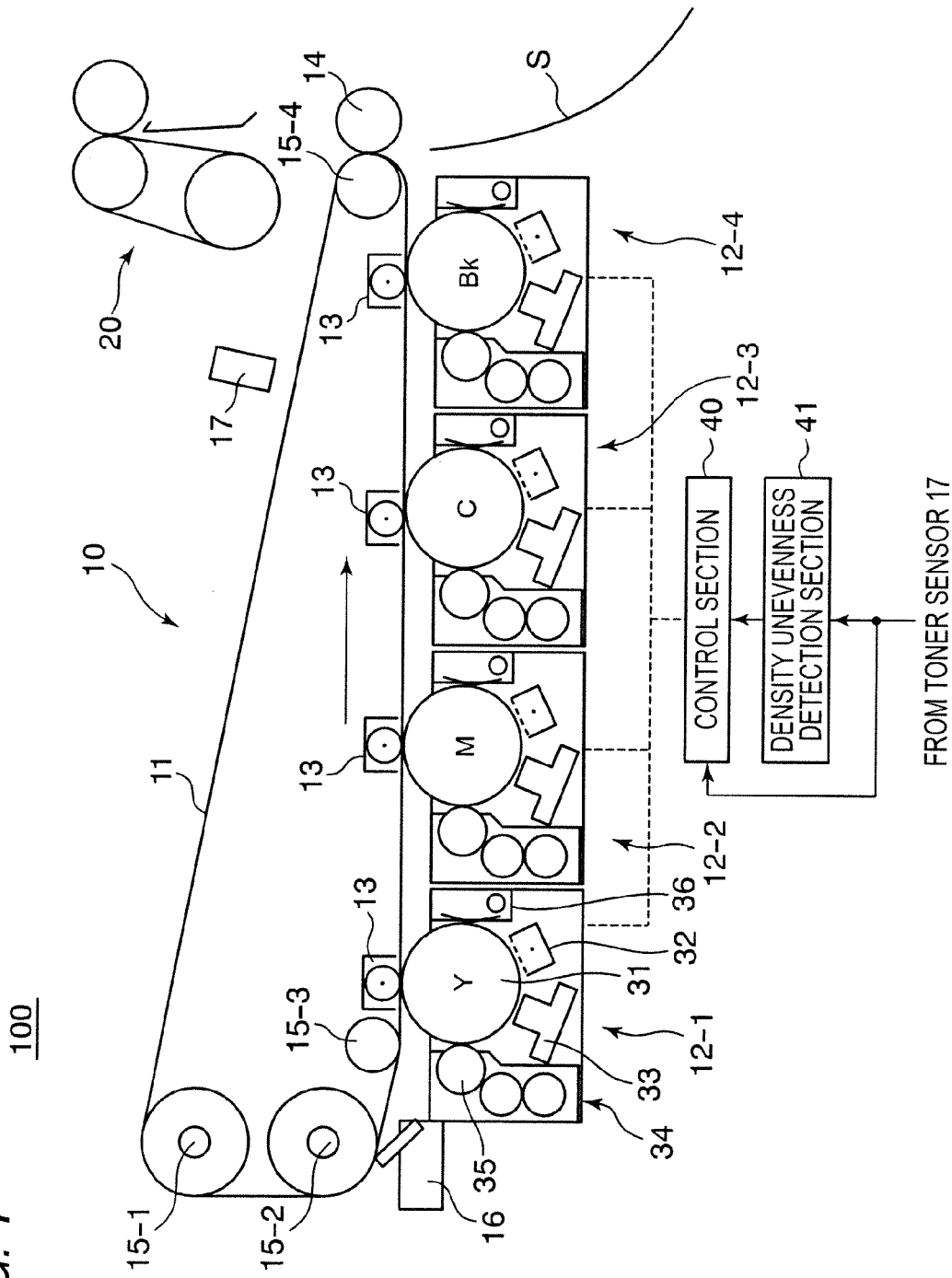
FIG. 1 is a diagram to schematically show a general configuration of an image forming apparatus of an embodiment.

FIG. 1 is a schematic diagram to show the general configuration of image forming apparatus 100 of an embodiment. Image forming apparatus 100 shown in FIG. 1 is a tandem-type color laser printer.

The image forming apparatus 100 in FIG. 1 includes imaging apparatus 10 for making an image by depositing unfixed toner onto recording paper S, and fixing device 20 for melting toner for fixation onto recording paper S.

Imaging apparatus 10 includes intermediate transfer belt 11, four image forming units 12-1 to 12-4, primary transfer rollers 13, and secondary transfer roller 14. Image forming units 12-1 to 12-4 are placed along intermediate transfer belt 11 and form toner images. Primary transfer rollers 13 are placed at positions opposing to respective photoconductors 31 via intermediate transfer belt 11, and transfer toner images formed by image forming units 12-1 to 12-4 onto intermediate transfer belt 11. Secondary transfer roller 14 transfers an image transferred to intermediate transfer belt 11 onto recording paper S.

Intermediate transfer belt 11 is wound around a plurality of rollers 15-1 to 15-4. Cleaning device 16 is placed at a position opposing to intermediate transfer belt 11, and recovers residual toner from intermediate transfer belt 11.

Further, toner sensor 17 is placed at a position opposing to intermediate transfer belt 11. Toner sensor 17 detects the density of a gradation pattern (toner image) formed on intermediate transfer belt 11 at the time of gradation correction. It is noted that the gradation pattern formed on intermediate transfer belt 11 at the time of gradation correction is removed as waste toner by cleaning device 16 after density detection.

A configuration example of toner sensor 17 will be described. Toner sensor 17 is an optical sensor. Toner sensor 17 includes a light emitting section for emitting light and a light receiving section for receiving light, and emits light from the light emitting section toward a toner patch and receives light reflected off the toner patch by the light receiving section. The light receiving section includes a light receiving element, and obtains a sensor output by converting the amount of light received by the light receiving element into an intensity of an electric signal. The toner patch is made up of a belt surface and a toner surface, and toner sensor 17 detects a hiding ratio by toner (the ratio of the area occupied by toner to the area of the entire patch). The sensor output decreases as the amount of light reflected from the belt surface decreases. As the density of the toner patch increases, the hiding ratio of belt surface by toner increases thereby decreasing the sensor output. Therefore, it is possible to detect the hiding ratio of belt surface by toner, that is, the density of the toner patch, through the magnitude of the sensor output (see FIG. 5). It is noted that the configuration of toner sensor 17 is not limited to the configuration described above, but may be any one capable of detecting density.

Image forming unit 12-1 forms a toner image in yellow (Y), image forming unit 12-2 forms a toner image in magenta (M), image forming unit 12-3 forms a toner image in cyan (C), and image forming unit 12-4 forms a toner image in black (BK). These image forming units 12-1 to 12-4 are placed in this order along intermediate transfer belt 11 from upstream to downstream thereof.

Each image forming unit 12 (12-1 to 12-4) includes photoconductor 31, charging device 32 for evenly charging photoconductor 31, light exposure device 33 for exposing charged photoconductor 31 with image light, and developing device 34 for developing using toner of each color a latent electrostatic image formed by light exposure.

Developing device 34 includes developing roller 35, and makes toner depart from developing roller 35 for deposition onto photoconductor 31. Cleaner 36 is placed at a position opposing to photoconductor 31, and cleaner 36 recovers residual toner from photoconductor 31. All image forming units 12-1 to 12-4 are controlled by control section 40.

Next, the operation of image forming apparatus 100 will be described.

A toner image developed on photoconductor 31 of each of image forming units 12-1 to 12-4 is primary-transferred onto intermediate transfer belt 11 by primary transfer roller 13 at a position where it is in contact with intermediate transfer belt 11.

The toner image transferred onto intermediate transfer belt 11 is superimposed with a toner image of different color every time it passes through image forming units 12-1 to 12-4. As a result of this, eventually, a full-color toner image is formed on intermediate transfer belt 11.

Next, the full-color toner image on intermediate transfer belt 11 is secondary-transferred at a time onto recording paper S by secondary transfer roller 14 positioned downstream of intermediate transfer belt 11.

Next, as the result of recording paper S passing through fixing device 20 which is located downstream of the conveyance path of recording paper S, the toner image is fixed, and recording paper S is discharged on a paper discharge tray (not shown). It is noted that recording paper S is contained in a cassette (not shown), and is conveyed sheet by sheet from the cassette to secondary transfer roller 14.

It is noted that after primary transfer, the toner remained on photoconductor 31 is removed by cleaner 36 which is placed downstream, and recovered in a waste toner box (not shown). Moreover, after secondary transfer, the toner remained on intermediate transfer belt 11 is recovered by cleaning device 16.

Here, in image forming apparatus 100, the image density of toner image may vary due to disturbances such as changes in the surrounding environment such as temperature and humidity, and the durability of the apparatuses. Accordingly, image forming apparatus 100 is configured such that to stabilize the image density, a test toner image (for gradation correction) is formed on intermediate transfer belt 11, and the toner deposition amount at each image forming unit 12-1 to 12-4 is controlled based on the density of the test toner image.

To be specific, the toner deposition amount for the toner image to be formed on intermediate transfer belt 11 is changed by developing device 34. In a toner image to be formed on intermediate transfer belt 11, the length of toner image in the circumferential direction of intermediate transfer belt 11 is change by developing device 34 and light exposure device 33.

Control section 40 controls the above-described toner deposition amount and the length of toner image by controlling developing device 34 and light exposure device 33. In reality, image forming apparatus 100 is configured such that a test toner image is formed on intermediate transfer belt 11 at the time of gradation correction, and the density of the toner image is detected by toner sensor 17. In response to this density detection result, image forming apparatus 100 performs gradation correction by correcting the gradation conversion table provided in control section 40. At the time of printing on recording paper S (that is, at the time of actual printing), image forming apparatus 100 forms on intermediate transfer belt 11 a toner image of which density has been corrected by controlling developing device 34 by use of the corrected gradation conversion table.

Detection results from density unevenness detection section 41 are input to control section 40. Density unevenness detection section 41 receives input of density detection results from toner sensor 17, and acquires a cycle of density unevenness and a density fluctuation amount at each density unevenness cycle. Further, density unevenness detection section 41 acquires, among cycles of density unevenness, a cycle at which a largest density fluctuation amount occurs, and outputs this cycle and the largest density fluctuation amount to control section 40. Based on this cycle and the density fluctuation amount, control section 40 determines the number and/or the position of the toner image for gradation correction.

[2] Gradation Correction

Next, gradation correction will be described in detail. It is noted that in the present description, "gradation level" may be restated as "density", and conversely, "density" may be restated as "gradation level".

Figure 2:
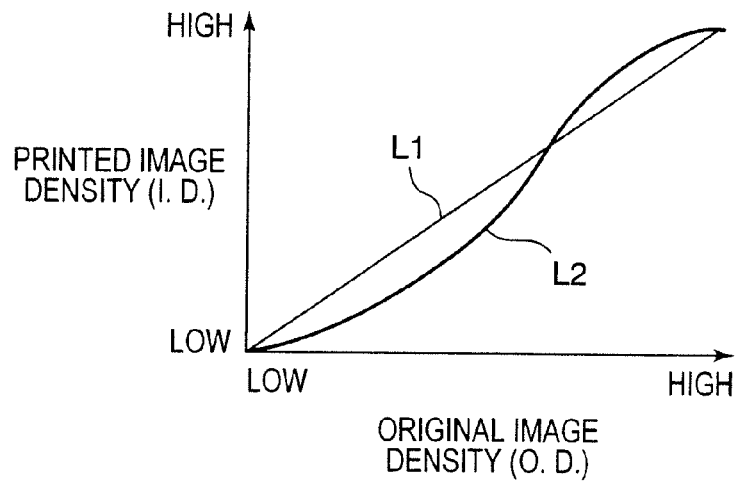
FIG. 2 is a diagram to show gradation characteristics which is the relationship of density between an original image to be input and an actual printed image.

FIG. 2 is a diagram to show gradation characteristics which is the relationship between density O.D. and density I.D. when it is supposed that the density indicated by input original image data is O.D. (Original Density), and the density of a printed image output on recording paper S is I.D. (Image Density). Maintaining a linear relationship such as shown by gradation characteristic line L1 of FIG. 2 in the relationship between density O.D. and density I.D. will make it possible to obtain an ideal printed image.

However, in reality, the relationship between density O.D. and density I.D. will become a nonlinear relationship as shown by gradation curve L2 of FIG. 2 due to fluctuation factors such as changes in the surrounding environment such as temperature and humidity, and variations in durability and production of the apparatus. As a result of this, the density of a printed image will significantly change for each gradation level from original image data to be input. As seen from gradation curve L2, normally, in a region where original image data is low in density, since printed image density I.D. becomes lower than original image density O.D., loss of color detail in highlights occurs so that it becomes difficult to reproduce a printed image having a very low density on recoding paper S. Further, in a region where original image data is high in density, since printed image density I.D. becomes higher than original image density O.D., loss of color detail in shadows occurs so that it becomes difficult to reproduce a density difference around the maximum density on recording paper S.

Accordingly, to match the density of a printed image with the density indicated by input original image data, it is necessary to correct gradation characteristics. To be specific, the relation between density O.D. and density I.D. is made to be stably linear at every gradation level by gradation correction. In reality, gradation correction is performed by correcting a gradation conversion table provided in control section 40.

A method for creating the gradation conversion table will be described. Image forming apparatus 100 forms a toner image having gradation pattern 50 such as that shown in FIG. 3 on intermediate transfer belt 11 at the time of gradation correction, and detects the density of this gradation pattern 50 by means of toner sensor 17. Gradation pattern 50 is made up of a plurality of gradation patches P1 to P10 having different gradation levels.

Figure 3:
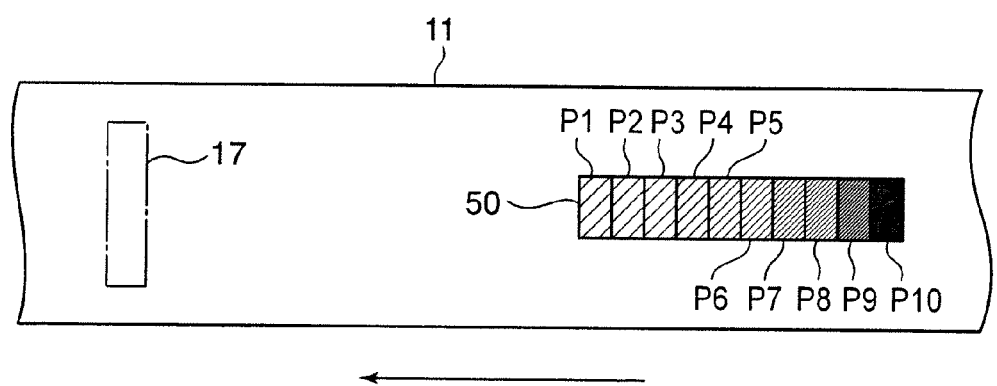
FIG. 3 is a diagram to be used for the illustration of a gradation pattern and a gradation patch.
Figure 4:
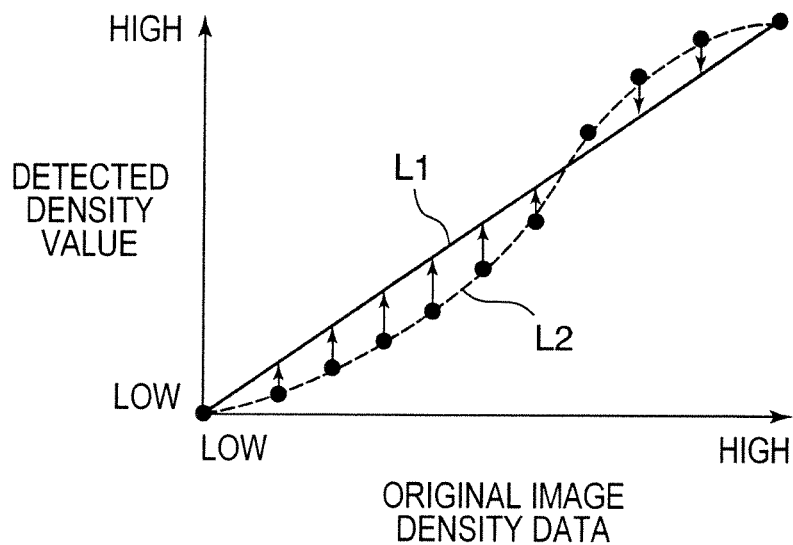
FIG. 4 is a diagram to show density detection values of a gradation pattern detected by a toner sensor in correspondence with original image density data.
Figure 5:
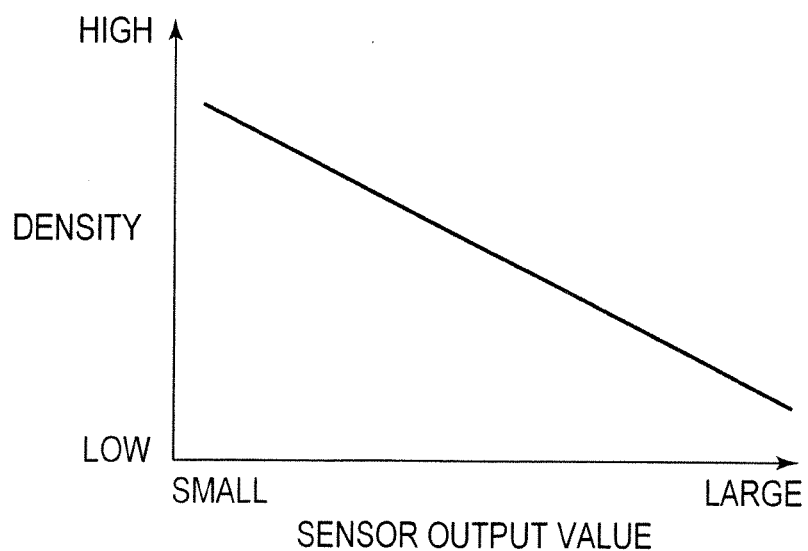
FIG. 5 is a diagram to show the relationship between toner sensor output values and densities.

FIG. 4 shows a plot of detected density (printed image density) values for gradation pattern 50 detected by toner sensor 17 against the corresponding original image density data. Dark dots in the figure respectively represent detected density values of gradation patches P1 to P10 (FIG. 3). The detected density value can be acquired by converting a sensor output value into a density using a conversion table which is created in advance and shows the relationship between sensor output values of toner sensor 17 and densities as shown in FIG. 5. As seen from FIG. 4, detected density values lie on gradation curve L2, deviating from target gradation characteristic line L1. Accordingly, gradation correction for correcting this deviation is required.

Figure 6:
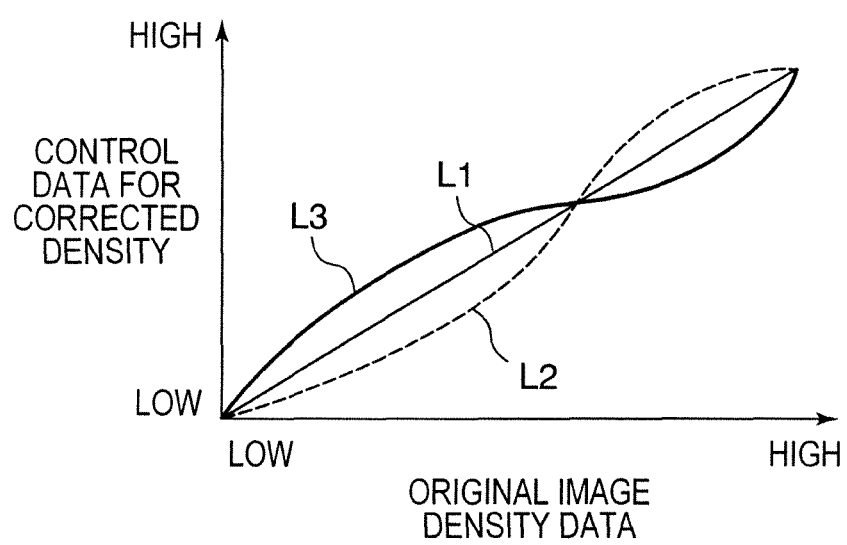
FIG. 6 is a diagram to show a state of a gradation conversion table (a curve L3 in the figure)

FIG. 6 shows a state of a gradation conversion table to be provided in control section 40. Curve L3 in FIG. 6 shows data of the gradation conversion table after correction. The correction data shown by curve L3 are arranged to be values that cancel deviations of gradation curve L2 from target degradation characteristic line L1. That is, upon input of original image data, using correction control data on curve L3 corresponding to original image data and controlling the toner image forming operation of image forming units 12-1 to 12-4 enables to match the density of toner image with the density on target gradation curve L1.

[3] Toner Image for Gradation Correction, and Gradation Correction According to the Present Embodiment Next, a method for forming a toner image for gradation correction and a method of gradation correction according to the present embodiment will be described in detail.

In the case of the present embodiment, gradation pattern 50 (FIG. 3) to be formed on intermediate transfer belt 11 at the time of gradation correction is made up of gradation patches P1 to P10 of 100%, 90%, 80%, 70%, 60%, 50%, 40%, 30%, 20%, and 10% with a maximum gradation being as 100%, which are connected side by side to one another. The length of gradation pattern 50 is adjusted such that each gradation patch P1 to P10 can be accurately detected by toner sensor 17. The width of gradation pattern 50 is adjusted such that detection can be satisfactorily performed even when the aperture of toner sensor 17, the attachment of toner sensor 17, the imaging position of image in major scanning direction, and the like fluctuate. Supposing that the diameter of developing roller 35 be 16 mm, the length on intermediate transfer belt 11, corresponding to one rotation of developing roller 35, will be 16 mm×3.14/1.5=33.5 mm (where 1.5 is a ratio of circumferential speeds between developing roller 35 and photoconductor 31).

Figure 7:
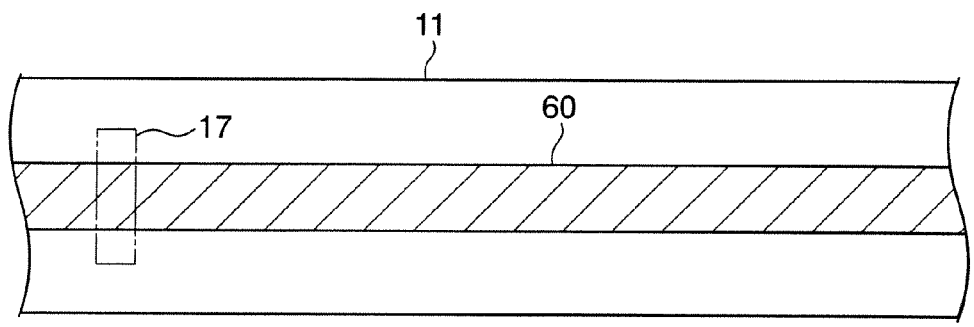
FIG. 7 is a diagram to show a toner pattern for one rotation of an intermediate transfer belt.
Figure 8:
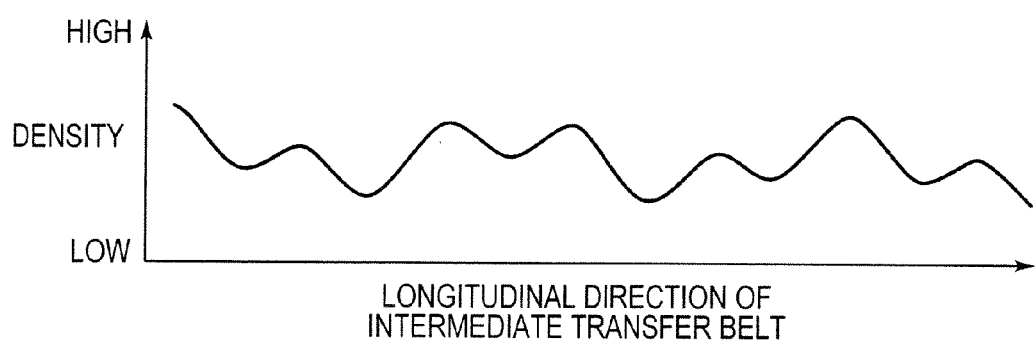
FIG. 8 is a diagram to show density detection values for one rotation of the intermediate transfer belt.

Image forming apparatus 100 of an embodiment is configured such that as a preprocessing of gradation correction, toner pattern 60 for one rotation of intermediate transfer belt is formed on the intermediate transfer belt as shown in FIG. 7 and toner pattern 60 is detected by toner sensor 17. The gradation level of toner pattern 60 may be uniform. Toner sensor 17 obtains a density detection value by fitting an obtained sensor output to the relationship of FIG. 5, and outputs the same to density unevenness detection section 41. To be specific, detected density values for one rotation of intermediate transfer belt 11 as shown in FIG. 8 are input to density unevenness detection section 41.

Figure 9:
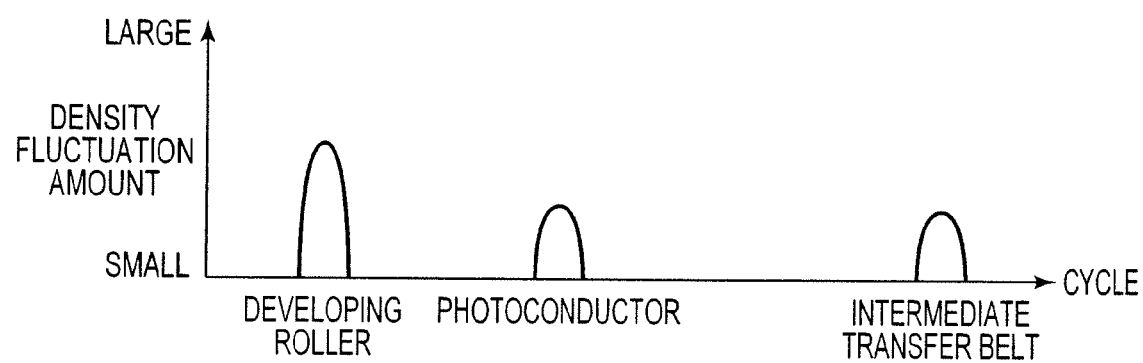
FIG. 9 is a diagram to show a frequency analysis result by a density unevenness detection section.

Density unevenness detection section 41 acquires a variation of the detected density detection for one rotation of intermediate transfer belt 11. Density unevenness detection section 41 Fourier-transforms the detected density values to calculate a density fluctuation amount for each cycle to analyze the frequency of the variation of the densities. That is, density unevenness detection section 41 obtains frequency analysis results such as those shown in FIG. 9. Finally, density unevenness detection section 41 acquires a cycle at which a largest density fluctuation amount occurs. The example of FIG. 9 is a case where the cycle of developing roller 35 shows the largest density unevenness. Density unevenness detection section 41 outputs this cycle of developing roller 35 and the density fluctuation amount thereof to control section 40.

Control section 40 determines the numbers and positions of gradation patterns for gradation correction separately for the following cases, based on the magnitude of the density fluctuation amount and the cycle at which the density fluctuation amount becomes largest, which have been input thereto.

Figure 10:
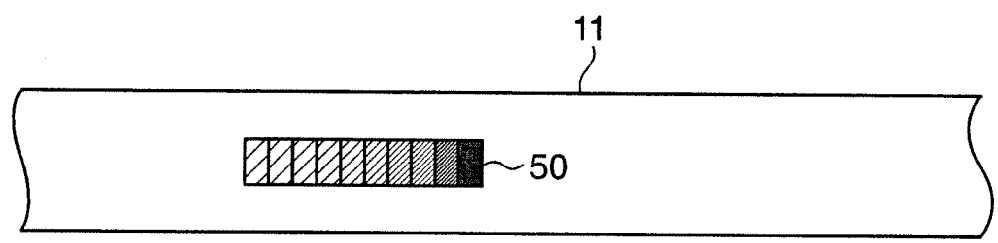
FIG. 10 is a diagram to show a gradation pattern to be formed when density fluctuation amounts of any cycle are within a predetermined threshold.

Case 1: When density fluctuation amount of any cycle is within a predetermined threshold In this case, as shown in FIG. 10, only one gradation pattern 50 is formed on intermediate transfer belt 11. The reason why only one gradation pattern 50 is formed in this way is that only small cyclic unevenness occurs in Case 1.

Here, suppose that toner sensor output values (V) when gradation pattern 50 of FIG. 10 has been detected by toner sensor 17 be IDC0, IDC10, IDC20, IDC30, IDC40, IDC50, IDC60, IDC70, IDC80, IDC90, and IDC100. IDC0, which is a gradation of 0%, is an output value of the base surface of intermediate transfer belt 11 without toner deposited thereon. IDC50 is a toner sensor output value when a gradation patch of a gradation of 50% is detected. The toner sensor output values obtained for the gradation patches are respectively converted into detected density values by using a predetermined conversion formula (FIG. 5).

In this way, when the density unevenness of any cycle is small, the accuracy of detection will not deteriorate even without creating a plurality of gradation patterns and averaging the detected density values. Since there is no need of creating a plurality of gradation patterns, it is possible to reduce toner consumption and the time necessary for gradation correction.

Case 2: When a largest density fluctuation amount is larger than a predetermined threshold, and the cycle at which that density fluctuation amount is obtained is the cycle of developing roller.

Figure 11A:
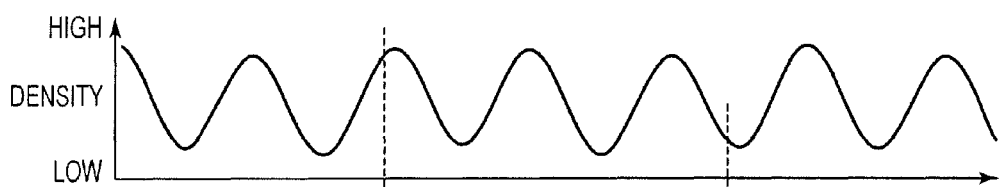
FIG. 11 is a diagram to show density detection values in a case where the cycle of the largest density fluctuation amount is the cycle of a developing roller (FIG. 11A), and a gradation pattern to be formed in that case (FIG. 11B)

In this case, as shown in FIG. 11, two gradation patterns 50-1 and 50-2 are formed on intermediate transfer belt 11.

The interval (shift amount) between two gradation patterns 50-1 and 5-2 may be an interval which is five times ½ of the length of intermediate transfer belt II corresponding to one rotation of developing roller 35 so as to cancel the unevenness due to the cycle of developing roller 35. If the length on intermediate transfer belt 11 corresponding to one rotation of developing roller 35 is 33.5 mm, the interval (shift amount) may be 83.75 mm.

It is noted that setting the interval (shift amount) of gradation pattern 50 to be multiples of an odd number of ½ of the cycle enables to cancel the cyclic unevenness. Further, the interval (shift amount) of gradation pattern 50 may be ⅓ of the cycle or other values, and what is essential is that it may be any interval provided it can cancel cyclic unevenness. That is, gradation pattern 5 may be formed at a position where up and down fluctuation of density due to cyclic unevenness is canceled when addition is performed.

Figure 11B:
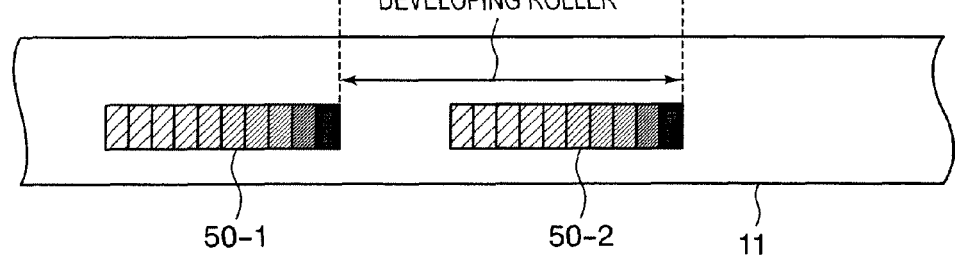

Here, in the toner sensor output values (V) when gradation patterns 50-1 and 50-2 of FIG. 11B are detected with toner sensor 17, it is supposed that the toner sensor output values (V) of first gradation pattern 50-1 be IDC0_1, IDC10_1, IDC20_1, IDC30_1, IDC40_1, IDC50_1, IDC60_1, IDC70_1, IDC80_1, IDC90_1, and IDC100_1, and the toner sensor output values (V) of second gradation pattern 50-2 be IDC0_2, IDC10_2, IDC20_2, IDC30_2, IDC40_2, IDC50_2, IDC60_2, IDC70_2, IDC80_2, IDC90_2, and IDC100_2. Then, as shown in the following formulas, two detected values are averaged for each gradation patch. In the following formulas, IDC0_ave, IDC10_ave, IDC20_ave, IDC30_ave, IDC40_ave, IDC50_ave, IDC60_ave, IDC70_ave, IDC80_ave, IDC90_ave, and IDC100_ave are average values for each gradation.

$$IDC0\_ave=(IDC0\_1+IDC0\_2)/2$$

$$IDC10\_ave=(IDC10\_1+IDC10\_2)/2$$

:

:

$$IDC100\_ave=(IDC100\_1+IDC100\_2)/2$$

Image forming apparatus 100 converts the above-described average value acquired for each gradation patch into a detected density value by using a predefined conversion formula (FIG. 5).

Case 3: When a largest density fluctuation amount is larger than a predetermined threshold, and the cycle at which the density fluctuation amount is obtained is the cycle of photoconductor 31.

Figure 12A:
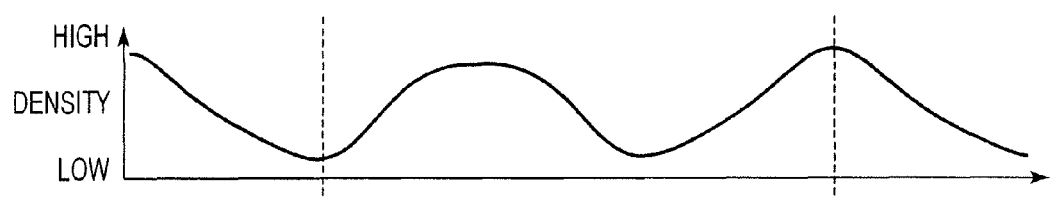
FIG. 12 is diagram to show density detection values in a case where the cycle of the largest density fluctuation amount is the cycle of a photoconductor (FIG. 12A), and a gradation pattern to be formed in that case (FIG. 12B)
Figure 12B:
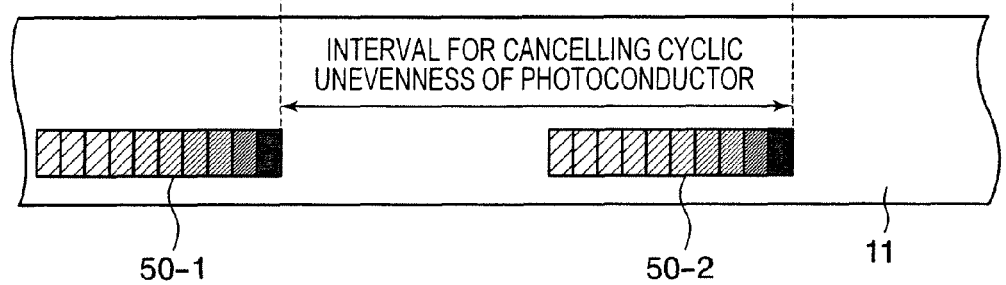

In this case, as shown in FIG. 12, two gradation patterns 50-1 and 5-2 are formed on intermediate transfer belt 11.

The interval (shift amount) between two gradation patterns 50-1 and 5-2 is arranged to be an interval which is three times ½ of the length of intermediate transfer belt 11 corresponding to one rotation of photoconductor 31 so as to cancel the unevenness due to the cycle of photoconductor 31. If the length on intermediate transfer belt 11 corresponding to one rotation of photoconductor 31 is 94.2 mm, the interval (shift amount) will be 141.3 mm.

It is noted that this interval (shift amount) may be, as described in Case 2, any interval provided it can cancel cyclic unevenness. Moreover, as described in Case 2, an average value of corresponding gradation patches may be acquired and based on that, a density detection value may be obtained.

Case 4: When a largest density fluctuation amount is larger than a predetermined threshold, and the cycle at which the density fluctuation amount is obtained is the cycle of intermediate transfer belt 11.

Figure 13A:
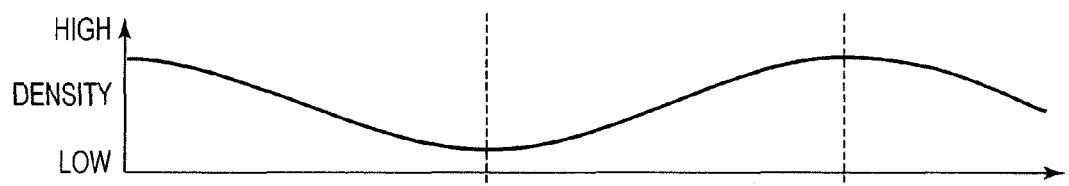
FIG. 13 is diagram to show density detection values in a case where the cycle of the largest density fluctuation amount is the cycle of an intermediate transfer belt (FIG. 13A), and a gradation pattern to be formed in that case (FIG. 13B)
Figure 13B:
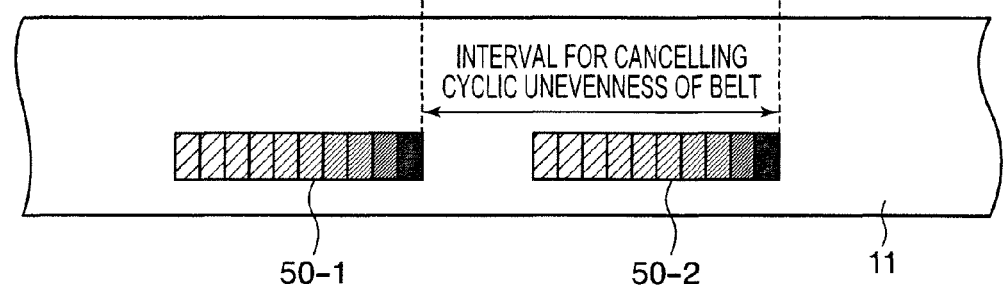

In this case, as shown in FIG. 13, two gradation patterns 50-1 and 5-2 are formed on intermediate transfer belt 11.

The interval (shift amount) between two gradation patterns 50-1 and 5-2 is arranged to be an interval which is ½ of the length of one rotation of intermediate transfer belt 11 so as to cancel the unevenness due to the cycle of intermediate transfer belt 11.

It is noted that this interval (shift amount) may be, as described in Case 2, any interval provided it can cancel cyclic unevenness. Moreover, as described in Case 2, an average value of corresponding gradation patches may be acquired and based on that, a density detection value may be obtained.

In any of Case 1, Case 2, Case 3, or Case 4, when a detected density value for each gradation level has been obtained as described above, a gradation conversion table (curve L3 of FIG. 6) for performing gradation correction based on the detected density values is calculated and is saved. At the time of actual printing, using this gradation conversion table to convert original image density data into control data for corrected density, and controlling the toner image forming operation of image forming units 12-1 to 12-4 enables to make gradation characteristics be linear.

Figure 14:
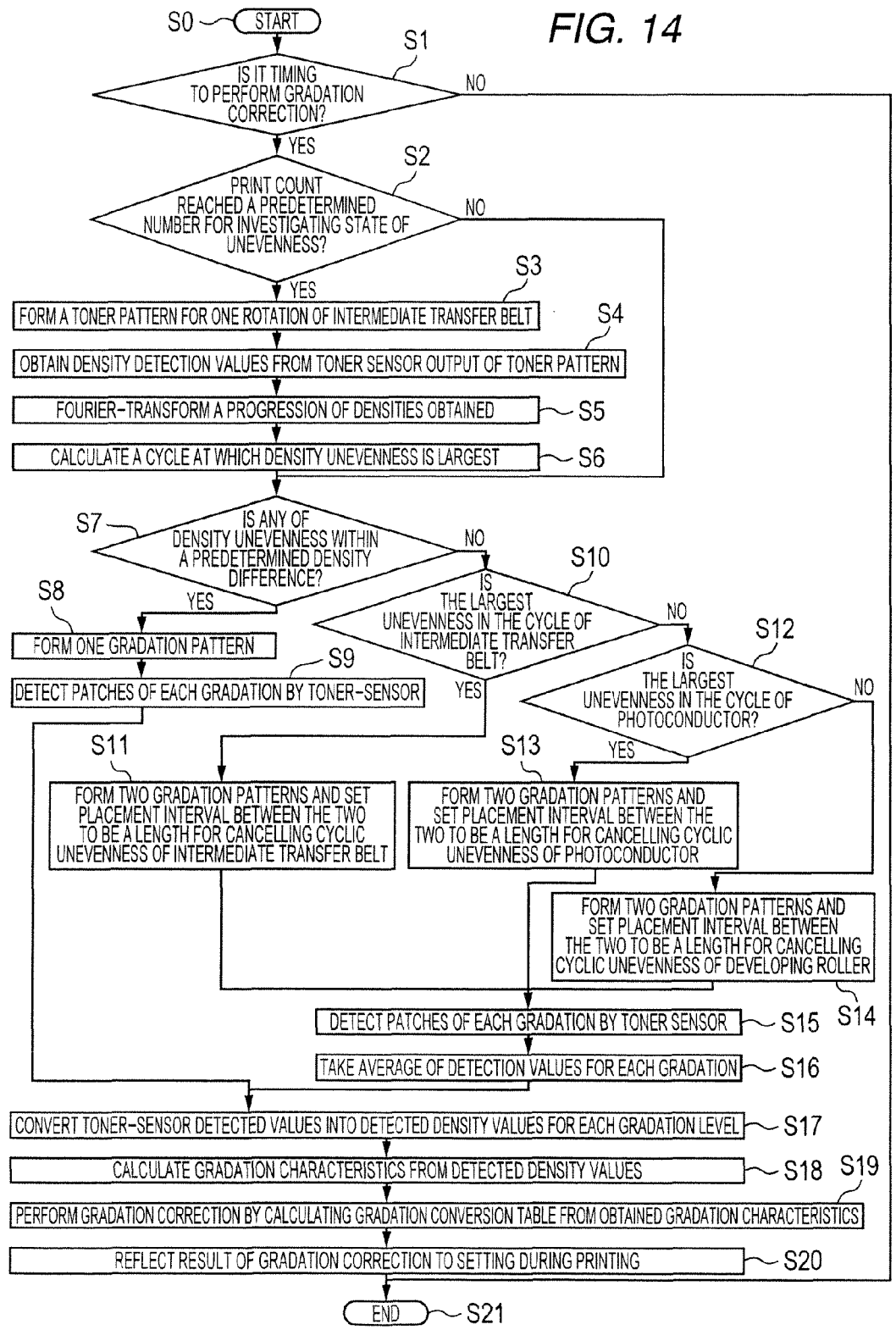
FIG. 14 is a flowchart to show the processing procedure of gradation correction according to an embodiment.

Next, using FIG. 14, the processing procedure for gradation correction according to the present embodiment will be described.

Image forming apparatus 100, first, starts processing at step S0, and in the following step S1, judges whether or not it is timing to perform gradation correction. When it becomes the timing to perform gradation correction (that is, upon turning on power, upon return from sleep, or timing when the external environment has significantly changed) (step S1; YES), image forming apparatus 100 proceeds to step S2.

In step S2, control section 40 judges whether or not the print count has reached a predetermined number at which to investigate density unevenness, based on a count value from a printed-sheet number counter (not shown). Control section 40 judges that the print count has reached a number for investigating density unevenness, for example, every time the print count reaches 1,000. If control section 40 judges that the print count has reached a number for investigating density unevenness (step S2; YES), the process moves to step S3.

In step S3, image forming units 12-1 to 12-4 form toner pattern 60 for one rotation of intermediate transfer belt 11 on intermediate transfer belt 11 as shown in FIG. 7. In the following step S4, toner sensor 17 obtains detected density values for toner pattern 60. In subsequent step S5, density unevenness detection section 41 Fourier-transforms a variation of the detected density values obtained in step S4 to obtain results of frequency analysis such as those shown in FIG. 9. In step S6, a cycle at which density unevenness is largest (that is, a cycle at which a largest density fluctuation amount occurs) is calculated by density unevenness detection section 41. In this way, the information of the density fluctuation amount and the cycle acquired by density unevenness detection section 41 is provided to control section 40.

In step S7, control section 40 judges whether or not any cycle of density unevenness is within a predetermined density difference (that is, the density fluctuation amount of any cycle is within a predetermined threshold), and upon obtaining a positive result, the process moves to step S8. In step S8, as shown in FIG. 10, only one gradation pattern 50 is formed on intermediate transfer belt 11 by image forming units 12-1 to 12-4 as shown in FIG. 10. In step S9, patches P1 to P10 of different gradation levels are detected by toner sensor 17. It is noted that the processing of steps S8 and S9 corresponds to the processing of Case 1 described above.

On the other hand, upon obtaining a negative result in step S7, the process moves to step S10. In step S10, control section 40 judges whether or not the largest unevenness is in the cycle of intermediate transfer belt 11.

If a negative result is acquired in step S10, the process moves to step S11, and two gradation patterns 50-1 and 50-2 are formed on intermediate transfer belt 11 by image forming units 12-1 to 12-4, as shown in FIG. 13. Then, the interval (shift amount) between these two gradation patterns 50-1 and 50-2 is set so as to cancel the unevenness due to the cycle of intermediate transfer belt 11. This processing corresponds to the processing of Case 4 described above.

On the other hand, if a negative result is obtained in step S10, the process moves to step S12. In step S12, control section 40 judges whether or not the largest unevenness is in the cycle of photoconductor 31.

If a positive result is acquired in step S12, the process moves to step S12, and two gradation patterns 50-1 and 50-2 are formed on intermediate transfer belt 11 by image forming units 12-1 to 12-4, as shown in FIG. 12. Then, the interval (shift amount) between the two gradation patterns 50-1 and 50-2 is set to cancel the unevenness due to the cycle of photoconductor 31. This processing corresponds to the processing in Case 3 described above.

On the other hand, if a negative result is obtained in step S10, the process moves to step S14. In step S14, as shown FIG. 11, two gradation patterns 50-1 and 50-2 are formed on intermediate transfer belt 11 by image forming units 12-1 to 12-4. Then, the interval (shift amount) between the two gradation patterns 50-1 and 50-2 is set to cancel the unevenness due to the cycle of developing roller 35. This processing corresponds to the processing in Case 2 described above.

After the processing of step S11, S13, or S14, image forming apparatus 100 proceeds to the processing of step S15. In step S15, patches P1 to P10 of different gradation levels are detected by toner sensor 17. In the following step S16, control section 40 takes average of toner detection values for each gradation level.

Image forming apparatus 100 converts toner sensor-detected values into detected density values for each gradation level in step S17. In step S18, gradation characteristics are calculated from the density detection values. In step S19, gradation correction is performed by calculating a gradation conversion table from the obtained gradation characteristics. To be specific, control section 40 creates curve L3 of FIG. 6 as a gradation conversion table after gradation correction. In step S20, the result of gradation correction is reflected to the setting during printing. Then, at step S21, gradation correction processing procedure ends.

It is noted that although in the example described above, description has been made on the case where it is detected at which cycle the largest density fluctuation has occurred, the developing roller cycle, the photoconductor cycle, or the intermediate transfer belt cycle; the cycle to be detected will not be limited to those cycles. What is essential is that a cycle at which a largest density unevenness occurs is detected by frequency analysis and based on the cycle, the positions of toner images such as gradation patterns may be determined such that cyclic unevenness is cancelled.

Further, although in the example described above, toner pattern 60 for one rotation of the intermediate transfer belt is created on intermediate transfer belt 11 as a preprocessing of gradation correction as shown in FIG. 7, and toner pattern 60 is detected by toner sensor 17, the length of toner pattern 60 may not necessarily correspond to one rotation of intermediate transfer belt 11, but may be shorter than that. However, if the length of toner pattern 60 is made shorter than one rotation of intermediate transfer belt 11, the cyclic unevenness caused by intermediate transfer belt 11 will be excluded from detection. That is, the reason why the length of toner pattern 60 is made to be one rotation of intermediate transfer belt 11 is that the cyclic unevenness of the longest cycle, which is expected in image forming apparatus 100, is that of intermediate transfer belt 11.

Further, although in the example described above, the number of gradation patterns to be formed in the case where the largest density fluctuation amount is larger than a predetermined threshold (Case 1, Case 2, Case 3, and Case 4) is assumed to be two, the number is not limited to two, but may be, for example, three or four. What is essential is that the number of gradation patterns to be formed may be changed according to the result of threshold judgment of density fluctuation amount.

Further, although in the example described above, gradation pattern 50 made up of ten gradation patches P1 to P10 of different gradation levels is used as the gradation pattern for the detection of density, the number of gradation patches for making up the gradation pattern is not limited to ten. Moreover, the toner image for gradation correction is not limited to such a gradation pattern.

Further, although in the example described above, description has been made on the case where the image carrying body is intermediate transfer belt 11, the present invention can be applied in the same fashion to image forming apparatuses in which a photoconductor belt, a photoconductor drum, or an intermediate transfer drum is the image carrying body.

Further, the image forming apparatus of the present invention can be applied to any of full-color copiers, printers, facsimiles, and multifunctional devices that provide copy, print, and fax capabilities.

As so far described, according to the present embodiment, density unevenness detection section 41 for detecting the cycle of density unevenness and the density fluctuation amount at each density unevenness cycle is provided, and the number and position of toner images for gradation correction to be formed on intermediate transfer belt 11 is changed based on the density fluctuation amount obtained by density unevenness detection section 41. To be specific, a toner pattern is created on intermediate transfer belt 11 as a preprocessing of gradation correction to calculate a cycle at which density unevenness is largest, and thereafter the toner image for gradation correction is created so as to cancel cyclic unevenness at the cycle at which the largest density unevenness occurs. As a result of this, it becomes possible to suppress the deterioration of density detection accuracy and perform a high accuracy gradation correction even if density unevenness of any cycle occurs.

So far, each embodiment of the present invention has been described. It is noted that the description provided above is provided by way of illustration of preferred embodiments of the present invention, and the scope of the present invention will not be limited thereto. That is, description of the configuration and operation of each apparatus described above is for exemplary purposes only, and it is obvious that various modifications and additions can be made to these examples within the scope of the present invention.

INDUSTRIAL APPLICABILITY

The present invention is applicable to, for example, image forming apparatus such as copiers, laser beam printers, facsimiles, and digital multifunction peripherals.

REFERENCE SIGNS LIST

10: IMAGING APPARATUS
11: INTERMEDIATE TRANSFER BELT
12-1, 12-2, 12-3, 12-4: IMAGE FORMING UNIT
17: TONER SENSOR
31: PHOTOCONDUCTOR
32: CHARGING DEVICE
33: LIGHT EXPOSURE DEVICE
34: DEVELOPING DEVICE
35: DEVELOPING ROLLER
40: CONTROL SECTION
41: DENSITY UNEVENNESS DETECTION SECTION
50: GRADATION PATTERN
60: TONER PATTERN
100: IMAGE FORMING APPARATUS
S: RECORDING PAPER
P1 TO P10: GRADATION PATCH

The invention claimed is:

1. An image forming apparatus including an image forming unit for forming a toner image on an image bearing member, and a density detection section for detecting a density of a toner image for gradation correction formed by the image forming unit, the image forming apparatus being adapted to perform gradation correction based on a density detection result obtained by the density detection section, wherein the image forming apparatus comprises:
a density unevenness detection section for detecting a plurality of cycles of density unevenness and a density fluctuation amount in each density unevenness cycle based on a density detection result obtained by the density detection section; and
a control section for determining a position of the toner image for gradation correction based on a cycle at which a largest density fluctuation amount occurs among the cycles of density unevenness detected by the density unevenness detection section, and wherein
the image forming unit modifies the toner image for gradation correction to be formed on forms the toner image for gradation correction on the image bearing member based on the position of the toner image for gradation correction determined by the control section;

wherein the control section changes the number of the toner image for gradation correction based on the density fluctuation amount;

wherein the toner image for gradation correction is a gradation pattern made up of a plurality of gradation patches having different gradation levels, and the control section is adapted to change the number of toner image for gradation correction such that, when the density fluctuation amount is less than a threshold, a first number of the gradation patterns are formed on the image bearing member, and when the density fluctuation amount is not less than the threshold, a second number of the gradation patterns are formed on the image bearing member, the second number being larger than the first number.

2. A gradation correction method in which a toner image for gradation correction is formed on an image bearing member of an image forming apparatus for performing gradation correction based on a density detection result of the toner image, the method comprising:

forming a toner image on the image bearing member;

detecting a plurality of cycles of density unevenness of the toner pattern and a density fluctuation amount in each density unevenness cycle;

changing the number or position of the toner image for gradation correction to be formed on the image bearing member based on the density fluctuation amount and the detected cycles of density unevenness, wherein the position of the toner image for gradation correction is determined based on a cycle at which a largest density fluctuation amount occurs among the detected cycles of density unevenness;

forming the toner image on the image bearing member based on the determined position of the toner image for gradation correction detecting a density of the toner image for gradation correction formed on the image bearing member; and performing gradation correction based on the detected density of the toner image for gradation correction;

wherein the number of the toner image for gradation correction is changed based on the density fluctuation amount;

wherein the toner image for gradation correction is a gradation pattern made up of a plurality of gradation patches having different gradation levels, and when density fluctuation amount is less than a threshold, a first number of the gradation patterns are formed on the image bearing member, and when the density fluctuation amount is not less than a threshold, a second number of the gradation patterns are formed on the image bearing member, the second number being larger than the first number.

* * * * *